April 21, 1959 W. B. ERNST ET AL 2,882,857
LAYING CAGES

Filed July 15, 1957 2 Sheets-Sheet 1

INVENTOR.
WILLIAM B. ERNST
BY JERRY BREININGER
PAUL BREININGER
John L. Woodward
ATTORNEY April 21, 1959 W. B. ERNST ET AL 2,882,857
LAYING CAGES
Filed July 15, 1957 2 Sheets-Sheet 2
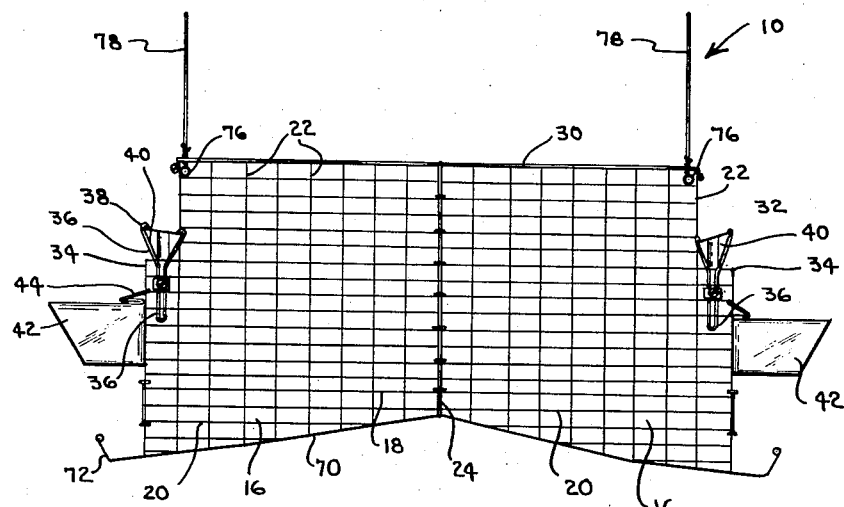
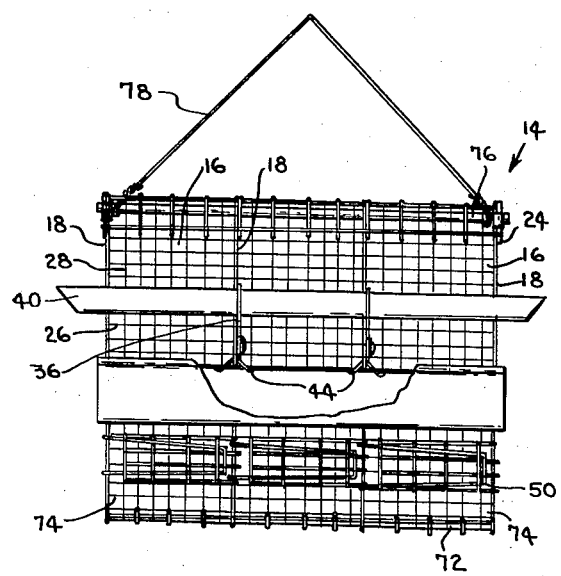
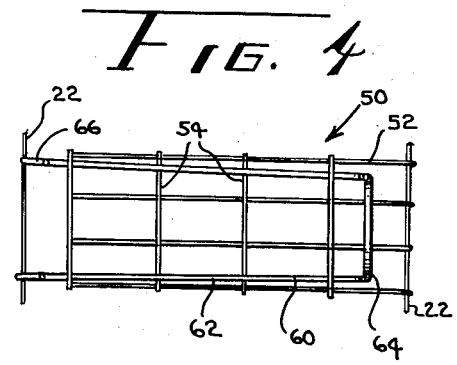
INVENTOR.
WILLIAM B. ERNST
JERRY BREININGER
BY PAUL BREININGER
John L. Woodward
ATTORNEY

United States Patent Office 2,882,857
Patented Apr. 21, 1959

2,882,857

LAYING CAGES

William B. Ernst, Sparta, and Jerry Breininger and Paul Breininger, Richland Center, Wis.; said Jerry Breininger and Paul Breininger assignors to said Ernst Application July 15, 1957, Serial No. 671,984

12 Claims. (Cl. 119—18)

This invention relates generally to cages and more particularly to laying and feeding cages for hens.

Heretofore the watering and feed troughs were positioned in the cages so that the water from the watering troughs fell into the feed troughs. The watering troughs for my laying cages are arranged on the cage with respect to the feed troughs so that the water from the watering troughs can not fall into the feed troughs.

The laying cages of this invention comprises a sloping floor for each cage in which the rear portion of the floor has a greater slope than the front portion of the floor so that eggs will readily roll from the rear of the floor of the cage and then gently roll from the front portion of the the cage floor to an egg tray at the front of the cage.

The top portion of the sides of the cage at the front of the cage is cut back to provide a shelf for support of a watering trough behind the feeding trough which is supported on the front of the cage below and ahead of the watering trough.

It is an object of this invention to provide a laying cage of means for mounting the watering trough on the front of the cage with respect to the feed trough so that water from the water trough can not fall into the feed trough.

It is another object of this invention to provide in a laying cage, an open front end for the cage, a door for each cage, and means for mounting the watering and feeding troughs on the open front end of the cage for restraining a hen in the cage.

It is another object of this invention to provide in a laying cage a floor so formed that an egg will quickly roll from the rear portion of the floor of the cage to the front portion of the floor and then roll more slowly on the front portion of the floor whereby the egg will be gently and safely rolled from the cage to a tray at the front of the cage.

It is another object of this invention to provide in a battery of laying cages, a support means arranged at the opposite ends of the sections in the battery of cages.

Other and further objects will become apparent as the detailed description of the laying cage proceeds and from the sub-joined claims.

Preferred embodiments of the laying and feeding cages according to the present invention as shown by way of example in the accompanying drawings in which:

Figure 2 is a side elevational view of one section in one of the battery cages.

Figure 3 is a front elevational view of one section of laying cages.

Figure 4 is a front elevational view of a hinged door used on each of the individual cages.

Figure 5 is a view of the top edge of the door disclosed in Figure 4.

Figure 1:
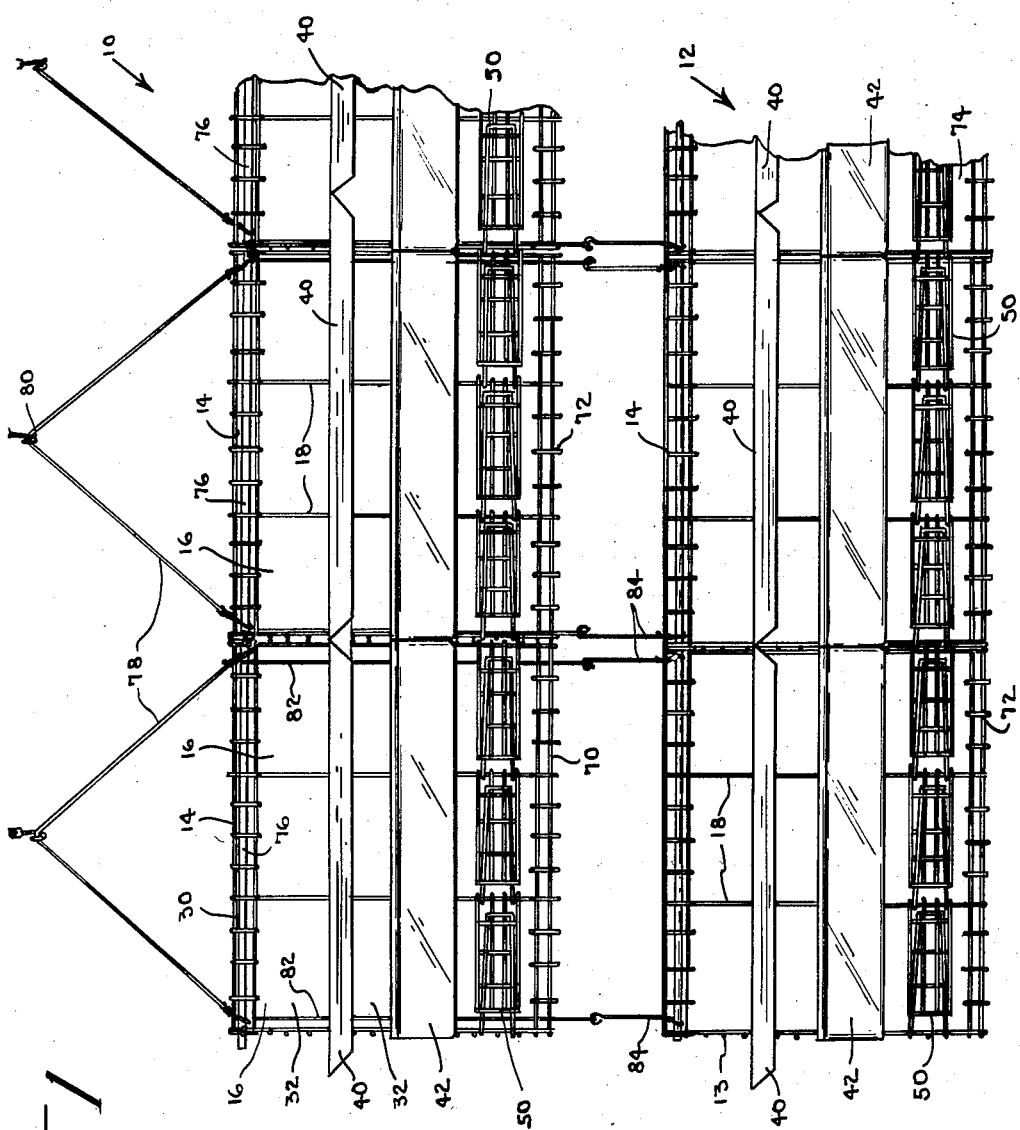
Figure 1 is a view in front elevation of two superimposed batteries of laying cages.

Referring in detail to the drawings in Figures 1, 2, and 3, 10 is an upper battery of laying cages and 12 is a lower battery of laying cages mounted below and under the upper battery of laying cages 10. The upper and lower battery of laying cages 10 and 12 being superimposed provide for economy of space and convenience in taking care of the hens.

A plurality of sections 14 are provided for each battery of laying cages 10 and 12 and the sections 14 are appropriately secured together. Three individual cages 16 are provided in each end of each of the cage sections 14.

Each individual cage 16 comprises spaced sides 18 and 18 formed of horizontally and vertically spaced strands of wire 20 and 22 secured to each other at the points of intersection by welding or other appropriate means. A rear end or wall 24 is formed of horizontally and vertically spaced strands of wire 26 and 28 respectively, appropriately secured together at their points of intersection. The end wall 24 is spaced intermediate the ends of the cage section 14 and serves as the ends of each of the individual cages 16. The end wall 24 is secured by ferrules to the sides 18. The horizontal and vertical strands of wire 20 and 22 in the sides 18 are spaced relatively close together and the horizontal and vertically spaced strands of wire 26 and 28 of the end wall 24 are also spaced relatively close together to prevent the hen from placing its head through the wire and moving its head sufficiently to interfere with the hen in the adjacent cage. The intermediate end wall 24 which serves as the end wall for the three horizontal cages 16 on both ends of each cage section 14 saves material.

The top 30 of each cage section 14 is formed of longitudinally and transversely spaced strands of wire welded or otherwise secured together at their points of intersection. The top 30 is fastened to the sides 18 of the cages 16 by ferrules and wire clips.

The front end 32 of each cage section 14 is open, which also saves material. The sides 18, 18 of each of the individual cages 16 are cut back at their front adjacent their upper portions forming a shelf like member 34 for each cage section 14. A plurality of loops of wire 36 are fastened by wing nuts and bolt means to the sides 18 of the cages 16 adjacent the open front end 32. The open or upper end of the loops of wire 36 are spaced apart and provided with lugs 38. The upper end of the loops 36 are spaced on the shelf 34 at the front of the cages 16 for each cage section 14. A watering trough 40 is mounted in the open end of the wire loops 36 and the lugs 38 thereon hold the watering trough 40 in an upright position. The watering trough 40 can be removed from the loops of wire 36 by sliding the trough 40 laterally of the cage section 14. The watering trough 40 is arranged at the upper portion of the open end 32 of the cage section 14 to sufficiently restrain a hen in each of the cages 16.

A feed trough 42 is removably supported by hooks 44 to the lower portion of the cage section 14 at its front end 32 and aids in restraining a hen in each of the cages 16 in each of the cage sections 14. The feed trough 42 is secured to the front end of the cage section 14 below and in front of the watering trough 40 so that water can not fall from the watering trough 40 into the feed trough 42.

A door 50 comprising horizontally and vertically spaced strands of wire 52 and 54 respectively which are secured together at their points of intersection is hinged by a hook 56 on one end of each of the horizontally spaced wires 52 to a vertical strand of wire 22 at the open end of each of the cages 16 adjacent the lower portion thereof. A lock member 60 formed from a loop of wire 62 is woven between the vertical strands of wire 54 of the door 50. A handle 64 is formed on the loop 62 adjacent the hinged end of the door 50 with a hook 66 formed on the free ends of the loop 62 for fastening to a vertical strand of wire 22 in the side 18 opposite to the hinged side of the door 50. The door 50 can be opened by sliding lock member 60 to the left, see Figure 4, releasing the hooks 66 from the vertical wire 22 in side 18 and then swinging the door 50 inwardly or outwardly of the cage 16. To close the door 50, it is moved to closed position, and lock member 60 is pulled to the right, see Figure 4 until hooks 66 re-engage vertical wire 22 in the side 18 of the cage 16.

The floor 70 of each of the cages 16 is formed of longitudinally and transversely spaced strands of wire which are secured together by welding at their points of intersection. The floor 70 is secured to the sides 18 by ferrules. The rear two-thirds of the floor 70 for each cage 16 is twelve inches long and slopes downwardly toward the front end 32 of the cage 16 by two inches. The front portion of the floor 70 is six inches long and slopes one-half inch toward the front of the cage 16. That is the rear portion of the floor 70 of the cage 16 is two times more sloping than the front one-third of the floor 70. In such a floor construction, the egg quickly rolls from the rear portion of the cage to the less sloping front portion of the floor 70 of the cage 16 where it will gently roll out of the cage 16 onto the egg tray 72 in front of the open end 32 of the cage 16. A small opening 74 is provided beneath the door 50 for the egg to roll out of the cage 16 onto the tray 72.

A rod 76 extends across the end of each cage section 14 and is secured to the top 30. A fastening member 78 extends from each of these rods 70 for suspending the cage sections 14 from hooks 80 in the ceiling of a poultry house. A wire member 82 secured to each end of each rod 76 extends downwardly through each corner of each of the cage sections 14 and is fastened to a hook member 84 on each corner of each cage section 13 at its top side in the lower battery of cages 12. The cage sections 13 and 14 being supported at their ends provide a firmly supported apparatus.

It is to be understood that changes in the size, arrangement of elements and material may be resorted to and all such changes are limited only by the scope of the subjoined claims.

What we claim is:

1. A laying cage for fowl and the like comprising defining walls at least one of which is a side wall of open mesh construction, a feed trough attached to said side wall substantially adjacent a lower portion thereof, a water trough attached to said side wall above and entirely inwardly of said feed trough, whereby water dripping from said water trough will drop inside of said feed trough.

2. A laying cage for fowl and the like as set forth in claim 1 wherein one of the defining walls is a floor, the rear two-thirds of the floor having a slope two times greater than the front one-third of the floor.

3. A laying cage for fowl and the like as set forth in claim 1 wherein the feed and water troughs are demountably attached to said side wall.

4. A laying cage for fowl and the like as set forth in claim 1 wherein an egg tray is formed on the front of the said side wall, the egg tray being spaced below the feed trough.

5. A laying cage for fowl and the like as set forth in claim 1 wherein the water and feed troughs attached to said side wall of the cage aids in restraining a fowl inside the cage.

6. A laying cage for fowl and the like as set forth in claim 1 wherein a hinged door is provided in said side wall below the feed trough.

7. A laying cage for fowl and the like as set forth in claim 1, wherein a hinged door is provided in said side wall below the feed trough, and wherein the door is hinged to another of the defining walls for swinging horizontally of the said side wall.

8. A laying cage for fowl and the like as set forth in claim 1 wherein a hinged door is provided in said side wall below the feed trough, and wherein the door is provided with a sliding latch means.

9. A laying cage for fowl and the like as set forth in claim 1 wherein means is mounted in the cage for aiding in suspending the cage from a support.

10. A laying cage for fowl and the like as set forth in claim 1 wherein rod means is mounted in the cage for aiding in suspending the cage from a support.

11. In a laying cage for fowl and the like as set forth in claim 1 wherein rod means mounted transversely of the cage substantially adjacent the top wall of the cage for aiding in suspending the cage from a support.

12. In a laying cage for fowl and the like as set forth in claim 1 wherein rod means is mounted transversely of the cage substantially adjacent the top wall thereof for aiding in suspending the cage from a support, and wherein depending means extends from the transverse rod means for aiding in supporting a second cage in spaced relation below the first mentioned cage.

References Cited in the file of this patent

UNITED STATES PATENTS

| | | |
|---|---|---|
| 1,575,674 | Cohen | Mar. 9, 1926 |
| 2,122,349 | Miles | June 28, 1938 |
| 2,303,615 | Cobb et al. | Dec. 1, 1942 |
| 2,512,861 | Hill | June 27, 1950 |
| 2,693,786 | Babros et al. | Nov. 9, 1954 |
| 2,700,369 | Kasser | Jan. 25, 1955 |
| 2,806,446 | Hendryx | Sept. 17, 1957 |

FOREIGN PATENTS

| | | |
|---|---|---|
| 429,639 | Great Britain | June 4, 1935 |
| 245,597 | Switzerland | July 16, 1947 |